May 3, 1932. G. E. BARRETT 1,856,903
WINDLASS AND CAPSTAN DRIVING MECHANISM
Filed Feb. 25, 1930 3 Sheets-Sheet 1

INVENTOR
George Eugene Barrett
BY
Fred E. Tasker
ATTORNEY

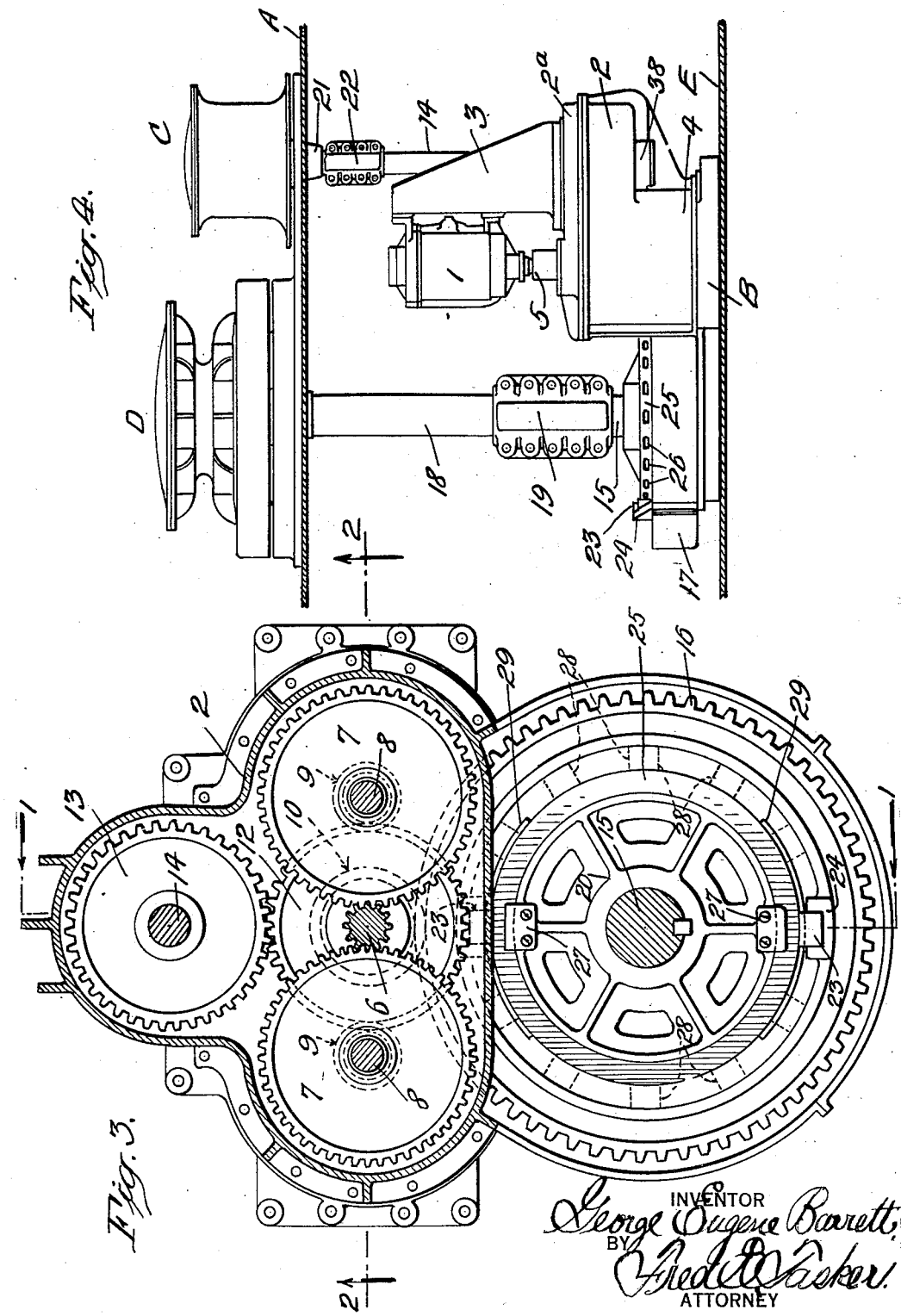

Patented May 3, 1932

1,856,903

UNITED STATES PATENT OFFICE

GEORGE EUGENE BARRETT, OF LAUREL SPRINGS, NEW JERSEY

WINDLASS AND CAPSTAN DRIVING MECHANISM

Application filed February 25, 1930. Serial No. 431,237.

My present invention comprises a novel, simplified, and more effective system of gearing for imparting motion to the windlass and capstan of a vessel, or any other similar mechanism. The object of the invention is to simplify the mechanism by using as few shafts, gears and pinions as possible to produce the desired result, thus economizing in space and in the cost of machine construction, besides concentrating and compacting the transmission machinery in a small compass, so as to secure greater strength, easier and quicker manipulation, fewer and smaller gears, a more powerful action, and surer and more accurate results, and numerous other advantages over more complicated mechanisms now in use.

With these and numerous other objects in view the invention may be said to consist essentially in the construction, combination, and arrangement of parts, substantially as will be hereinafter more fully described, and then pointed out in the ensuing clauses of claims.

For convenience in explanation, I have selected a windlass and capstan, or similar appliances, and their driving mechanism, in use generally today on many battleships, cruisers and other vessels, not because my invention restricts me to a combination of my simplified gear transmission with such machinery, but because it will be commonly used therewith, though it will be obvious that it may be used with other classes of machines.

Such driving mechanisms commonly include a variable speed driving pump, and a variable speed driven pump, with connections whereby the driving pump drives the driven pump, but I lay no claim herein to these power machines, and have only indicated a single driving pump, as an example or specimen of driving power for the windlass and capstan which may be actuated jointly or separately, but obviously any other kind of driving power may be substituted and successfully employed with my improved gear transmission.

In the accompanying drawings illustrating my invention:

Figure 3 is a horizontal section on the line 3, 3, of Figure 2.

Figure 4 is a side elevation of a ship's windlass and capstan, with an outside view of my improved mechanism for operating the same.

Like characters of reference denote like parts in all the different figures of the drawings.

Figure 1:
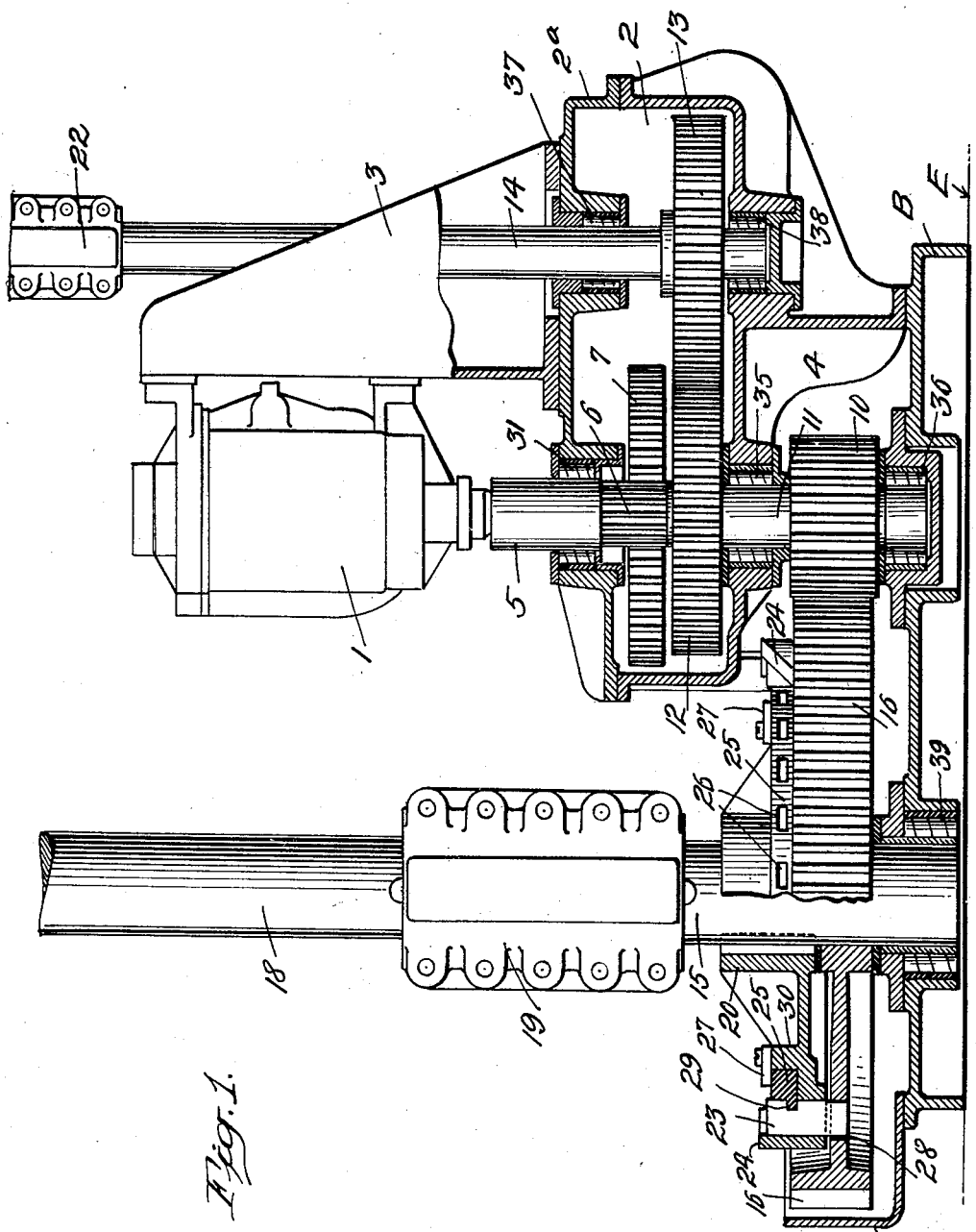
Figure 1 is side elevation partly in section of my improved gear transmission system for actuating windlasses and capstans and similar devices, the same being taken on the line 1, 1, of Figure 3.

1 denotes the outline of a driven pump, which itself constitutes a driving agency for a windlass and capstan, or other mechanism, through the intervening simplified gear transmission which forms the subject matter of my present invention. A variable speed driven pump in the marine installations above referred to is often actuated by a variable speed electrically driven driving pump; but these power machines do not form a part of the present invention, and I do not consider it necessary to describe or illustrate the same further than I have already done; and it will be understood that the pump 1 stands to represent any kind of motor, engine, or other power appliance to drive a windlass and capstan, singly or jointly, or other mechanism, through the connecting novel system of gearing which I shall now set forth in detail.

In Figure 4 I have shown a windlass and a capstan so as to indicate their relation to the mechanism that drives them. In Figure 4 a partial cross-section of a ship is depicted in outline, A being one deck on which the windlass D and capstan C may be supported, and E being a lower deck on which the machinery for driving these and similar devices may be carried. The decks are represented simply to assist in the explanation.

The windlass D has a revolvable member, called the wildcat in nautical language, which is provided with teeth $d$ that are adapted to be engaged by the anchor chain, said wildcat being secured to a vertical shaft 18 by means of which it is rotated. Shaft 18 is connected by a coupling 19 to a shaft 15 vertically beneath it, so that the two shafts 15 and 18 together constitute a continuous member, said shaft 15 carrying a part of the gear transmission, as I shall narrate in detail hereafter. Likewise the capstan C is adjacent to the windlass C on deck A, and it has its drum keyed or fastened to a vertical driving shaft 21 therefor, carried in some suitable bearing in deck A; and shaft 21 is connected by a coupling 22 to a shaft 14 vertically beneath it, so that the two shafts 21 and 14 together constitute a continuous member, said shaft 14 carrying a part of the gear transmission mechanism, as I shall explain.

A pressing problem in connection with the driving mechanism for the windlasses and capstans of vessels has been that of reducing the cost of construction and promoting the ease and speed of the operation of such mechanisms. Heretofore such mechanism has been complicated and burdensome. In my former Letters-Patent granted on July 5, 1927, No. 1,634,766, I showed how a substantial reduction in the number of parts and a more compact arrangement of the same would secure substantial benefits in many places. In my present improvements I offer a further simplification of mechanism to subserve other and additional distinct advantages. The simple form of gearing I now utilize will be described in the following.

The specimen driving agent 1, which may be a pump if desired, has a vertical shaft 5. Said driving means 1 is mounted upright in a frame 3, on the cover 2a of a gear casing 2, supported on frame 4, that is mounted on bed frame B, secured to deck E, see Figure 1, the said arrangement being only an example of convenient means for localizing these parts in effective relation to the gearing system.

Vertical shaft 5 passes through a bearing 31 in cover 2a into the interior of casing 2 which is filled with oil in which the gears may run and be thoroughly lubricated. Shaft 5 has keyed thereon a wide pinion 6 that engages and drives two horizontal gear wheels 7, 7, which lie in the same horizontal plane and are respectively keyed firmly to short parallel vertical shafts 8, 8, which are carried in upper bearings 32, 32, in the cover member 2a, and in lower bearings 33, 33, in the bottom of casing 2. These parallel short shafts 8 have wide vertical pinions 9, 9, thereon, one on each, which are directly below the gear wheels 7, 7, so that said gears 7 and 9 and shafts 8 constitute a pair of units, the upper and lower ends of each shaft 8 serving as journals and turning easily in the bearings 32 and 33. Thus I provide two combined gear wheel and pinion units which are built closely together as described or in any other suitable manner, and for which the shafts 8 have their ends made as journals that rotate in the upper bearings 32 and the lower bearings 33.

The two pinions 9, 9, or pinion members of the combined wheels, mesh with an intermediate gear wheel 12, which is directly below the lower end 34 of shaft 5. This end 34 is reduced in size and has a bearing in the upper end of a short vertical shaft 11, to which the gear wheel 12 is secured; and said shaft 11 has an upper bearing 35 in the bottom of casing 2, and a lower step bearing 36 supported in the bed plate B. Shaft 11 carries a large wide pinion 10 which is below casing 2 and outside of it. All of these gears which I have described, except gear or pinion 10, are enclosed in casing 2 and run in the oil therein. In said case is also another gear wheel 13, on the capstan shaft 14, and gear 13 is in the same horizontal plane as gear 12 and meshes with and is driven by the gear wheel 12 which is on shaft 11 as already described. The casing 2, as seen in Figure 3, is of a suitable shape to easily accommodate these gears therein and provide a lubricant chamber; and the cover 2a is built to provide the necessary bearings as described and is secured on the casing in any desired manner.

The capstan shaft 14 that is driven by gear wheel 13 has a bearing 37 in the frame cover 2a and a lower step bearing 38 in the bottom of casing 2 and top part of frame 4, see Figure 1. And the windlass-actuating shaft 15 is supported at its lower end in a bearing 39 in the base B. On shaft 15 is a large gear wheel 16 that is driven by the pinion 10. Said gear wheel is loose on shaft 15, and is not in the lubricant casing, but outside of same, as is pinion 10, but gear 16 is preferably protected by the circular band or guard 17 fastened at its ends to casing 2 and at its lower edge to the bed frame B. All of the various bearings that I have referred to will be fitted in any desired manner with ball or roller bearings, gaskets, glands, or other forms of packing to make the running the easiest possible.

Figure 2:
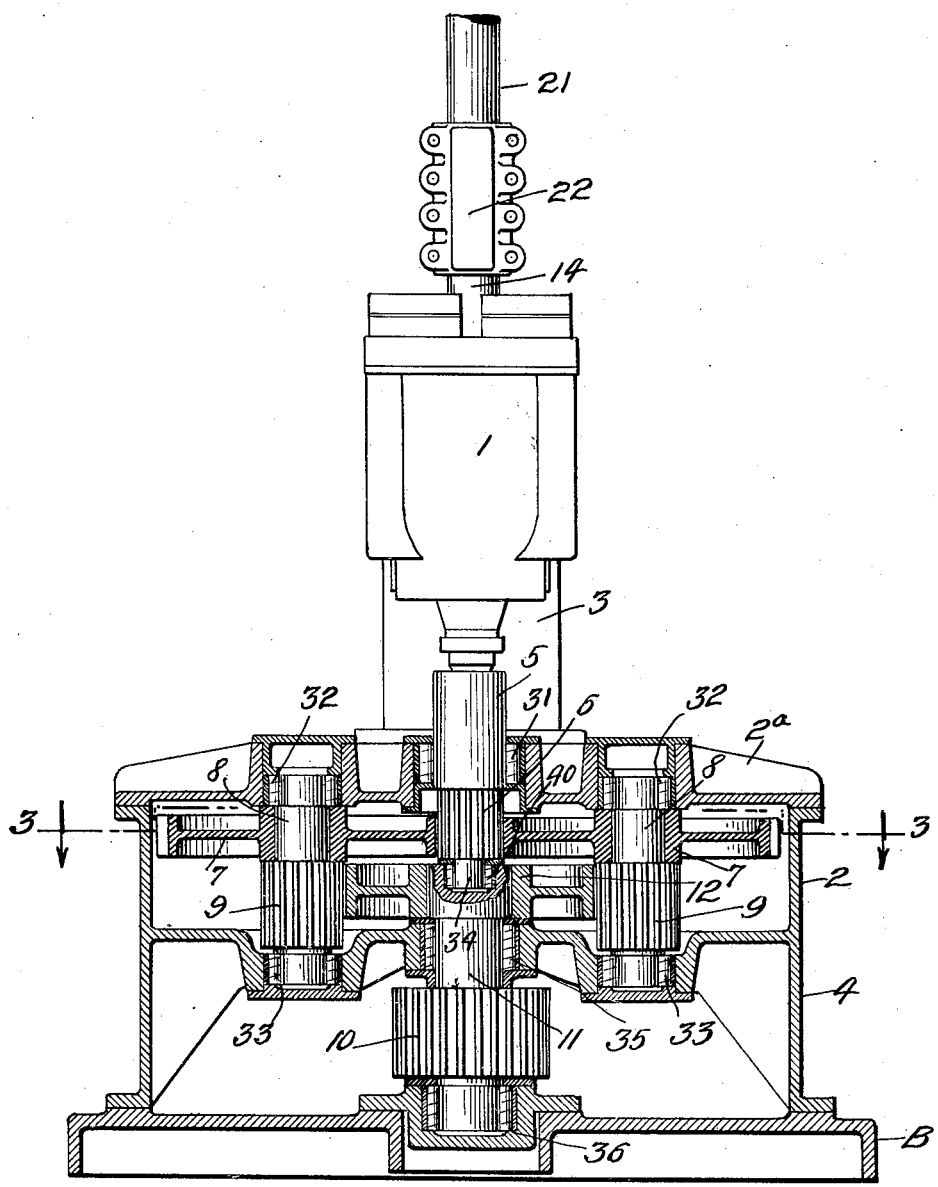
Figure 2 is a vertical cross-section of the same on the line 2, 2, of Figure 3, certain parts being indicated in side view.

The journal 34 on the lower end of pinion 6 revolves in a bearing 40 in the upper end of shaft 11. In Figure 2 the grouping of all the gears and pinions from pinion 6 to pinion 10 is shown clearly, and Figure 3 further discloses the relative arrangement and operation very helpfully. The whole arrangement of gears is light and strong. As the pinion 6 drives the two gears 8, the tooth load is divided in half, and this allows the use of smaller gears and a more compact arrangement than would be possible if heavy gears were required. The pinion 6 drives the two gears 8, to which the pinions 9 are secured;

and they in turn rotate the intermediate gear wheel 12 located directly below the pinion 6 and on a pinion shaft 11, so that pinion 10, which is directly in a vertical line with gear wheel 12 and pinion 6, becomes the transmitting power pinion to engage with and actuate the large windlass-driving gear wheel 16.

I will now explain the devices for locking the windlass shaft 15 to the large loose driving gear wheel 16, so that pump or motor 1 will drive shaft 15, and shaft 18 coupled to shaft 15, and drive windlass D. In the combination shown and described the driving mechanism is connected with the capstan C so as to operate the latter whenever motor 1 is running, but in order to operate the windlass D at the same time with capstan C the large loose gear 16 must be fastened to the windlass shaft so as to drive the latter. In the specific example given therefore the windlass and capstan may be driven together or the capstan may be driven separately. Obviously by the use of another clutch the capstan might be declutched to allow the windlass to be driven when the capstan is quiet.

Keyed to the shaft 15 above the loose gear wheel 16 is a horizontal locking head or wheel 20, see Figure 1. The upper surface of gear wheel 16 is provided with a circular series of rectangular or other openings 28, see Figure 3, adapted to be entered by a pair of locking block keys 23. These keys are raised and lowered so as to be caused to engage with or be disengaged from two or more of the openings 28 by means of a ring 25, which loosely surrounds a flange 30 on wheel 20 and is kept in place by small plates 27 that overlap and cover the same, said ring 25 being moved and adjusted around the flange 30 by using a bar or handle that is inserted in one or more of the openings 26 in the side of ring 25. Ring 25 further has a couple of inclined ribs 29 that engage notches in the locking blocks 23. Thus by rotating ring 25 more or less the blocks 23 may be lowered through their holders 24 on wheel 20 down into or raised up out of holes 28, and thus connection be made or broken between members 16 and 20, so that the train of parts may be active to drive the windlass or may be thrown out of action to make the windlass idle.

What I claim, is:

1. In a mechanism of the character described, the combination with driving means and driven means, of transmission mechanism connecting them, and consisting essentially of a shaft, a gear wheel loose thereon, means for locking it thereto, a second shaft parallel to the first, a pinion thereon, a pair of combined gear wheels and pinions, of which the gear wheels lie in the same plane and are engaged by the said pinion on the second shaft, a third shaft in line with the second shaft, a gear wheel on the third shaft engaged by the two pinions of the combined wheels, a pinion on said third shaft that engages the gear wheel on the first shaft, a fourth shaft parallel to the other shafts; and a gear wheel on the fourth shaft that is engaged by the intermediate gear wheel on the third shaft.

2. In a transmission mechanism for the operation of plural driven means jointly or independently as described, two parallel shafts that transmit power to different driven means, a gear wheel loose on one shaft, means for locking it thereto, a gear wheel fast on the other shaft, and an intermediate train of gearing and other parts, consisting of a power-driven pinion, a pair of combined gear wheels and pinions of which the gear wheels lie in the same plane and are engaged by the power-driven pinion, an intermediate gear wheel engaged by the two pinions of the combined wheels and itself engaging the gear wheel fast on one driving shaft, and a pinion engaging and driving the aforesaid loose gear wheel and having a journal that carries the aforesaid intermediate gear wheel.

3. In a transmission mechanism of the class described, the combination of two parallel shafts, a windlass and a capstan, means connecting one of the shafts with the windlass, means connecting the other shaft with the capstan, a loose gear wheel on one shaft, means for locking it thereto, a fast gear wheel on the other shaft, a power-driven pinion, a shaft on which it is carried, a pair of combined gear wheels and pinions and their journals, the gear wheel members thereof being engaged by the power-driven pinion, an intermediate gear wheel engaged by the pinion members of the combined wheels, said intermediate gear wheel engaging the aforesaid fast gear wheel on one of the shafts, a shaft carrying said intermediate gear wheel, and a pinion on said shaft in mesh with the loose gear wheel.

4. In a mechanism of the character described, the combination of a windlass and a capstan, two parallel shafts, one of which drives the windlass and the other the capstan, a loose gear wheel on the windlass shaft, means for locking it thereto, a gear wheel fast on the capstan shaft, a power-driven pinion, a third shaft therefor, a pair of combined gear wheels and pinions whose gear members are situated in the same plane and in mesh with the aforesaid pinion, an intermediate gear wheel in mesh with the pinion members of the combined wheels, and the gear on the capstan shaft, a fourth shaft rectilineally below the third shaft, a pinion thereon in mesh with the gear wheel on the windlass shaft, and a gear box enclosing a part of the gears, and in which the combined wheels are journaled.

In testimony whereof I hereunto affix my signature.

GEORGE EUGENE BARRETT.